United States Patent
Nishimura et al.

(10) Patent No.: US 6,434,929 B1
(45) Date of Patent: Aug. 20, 2002

(54) CONTROL APPARATUS FOR DIRECT INJECTION ENGINE

(75) Inventors: Hirofumi Nishimura; Youichi Kuji, both of Hiroshima-ken (JP)

(73) Assignee: Mazda Motor Corporation, Aki-gun (JP)

(*) Notice: Subject to any disclaimer, the term of this patent is extended or adjusted under 35 U.S.C. 154(b) by 0 days.

(21) Appl. No.: 09/487,311

(22) Filed: Jan. 19, 2000

(30) Foreign Application Priority Data

Feb. 9, 1999 (JP) .......................................... 11-031972

(51) Int. Cl.$^7$ ............................................. F02M 25/06
(52) U.S. Cl. ............................... 60/278; 60/285; 60/286
(58) Field of Search .......................... 60/278, 285, 286, 60/295, 301, 274; 123/295

(56) References Cited

U.S. PATENT DOCUMENTS

| | | | | |
|---|---|---|---|---|
| 4,955,339 A | * | 9/1990 | Sasaki et al. ................ | 123/295 |
| 5,207,058 A | * | 5/1993 | Sasaki et al. ................ | 60/286 |
| 5,313,920 A | * | 5/1994 | Matsushita .................. | 123/295 |
| 5,642,705 A | * | 7/1997 | Morikawa et al. ........... | 60/285 |
| 5,732,554 A | * | 3/1998 | Sasaki et al. ................ | 60/278 |
| 5,775,099 A | * | 7/1998 | Ito et al. ...................... | 60/286 |
| 5,890,360 A | * | 4/1999 | Sasaki et al. ................ | 60/278 |
| 6,044,642 A | * | 4/2000 | Nishimura et al. .......... | 60/286 |
| 6,116,208 A | * | 9/2000 | Nishimura et al. .......... | 60/278 |
| 6,141,960 A | * | 11/2000 | Takami et al. .............. | 60/286 |
| 6,173,570 B1 | * | 1/2001 | Mitsumoto et al. ......... | 60/285 |
| 6,173,571 B1 | * | 1/2001 | Kaneko et al. .............. | 60/285 |
| 6,192,672 B1 | * | 2/2001 | Kerns ........................... | 60/285 |

FOREIGN PATENT DOCUMENTS

EP          0 896 134 A2     2/1999

* cited by examiner

*Primary Examiner*—Thomas Denion
*Assistant Examiner*—Tu M. Nguyen
(74) *Attorney, Agent, or Firm*—Nixon Peabody, LLP; Donald R. Studebaker

(57) ABSTRACT

In a direct injection engine including an injector (22) for directly injecting fuel into a combustion chamber (15) and a lean NOx catalyst (36), an ECU (50) changes the air-fuel ratio from that higher than the stoichiometric air-fuel ratio to that substantially equal to or lower than the stoichiometric air-fuel ratio. When the air-fuel ratio has changed from a air-fuel ratio higher than the stoichiometric air-fuel ratio to an air-fuel ratio substantially equal to or lower than the stoichiometric air-fuel ratio, the ECU controls to divisionally execute fuel injection from the injector (22) in at least two injections, i.e., leading injection that starts within the intake stroke period and trailing injection that starts within the compression stroke period.

18 Claims, 10 Drawing Sheets

TRAILING INJECTION TIMING(CA BTDC)

DIVIDING RATIO
(LEADING)(TRAILING)
—○— 50 : 50
—□— 70 : 30
—△— 30 : 70

TRAILING INJECTION TIMING(CA BTDC)

TRAILING INJECTION TIMING(CA BTDC)

TRAILING INJECTION TIMING(CA BTDC)

CONTROL APPARATUS FOR DIRECT INJECTION ENGINE

BACKGROUND OF THE INVENTION

1. Field of the Invention

The present invention relates to a control apparatus for a direct injection engine, which comprises an injector for directly injecting fuel into a combustion chamber, and comprises a lean NOx catalyst in the exhaust path of the engine.

2. Description of the Related Art

One conventional injection engine comprises an injector for directly injecting fuel into a combustion chamber, and improves fuel economy by lean burn by means of stratified combustion. In an engine of this type, a lean NOx catalyst that adsorbs NOx in an excess oxygen atmosphere and releases NOx as the oxygen concentration decreases is inserted in the exhaust path, and can purify NOx even in lean combustion.

When the engine comprises the lean NOx catalyst, it must be regenerated or refreshed by releasing NOx when its adsorbed NOx amount increases. For example, when lean combustion continues for a long period of time, the catalyst is regenerated by periodically changing the air-fuel ratio to a value equal to or lower than a stoichiometric air-fuel ratio for a predetermined period of time. Upon catalyst regeneration, it is required to cause easy NOx desorption reaction and to reduce desorbed NOx so as not to directly exhaust it. For this purpose, a deoxidizing agent such as CO must be sufficiently present in the atmosphere.

As a technique for regenerating such lean NOx catalyst, for example, a technique that makes additional injection during an expansion stroke in addition to main injection for stratified combustion upon catalyst regeneration is known, as disclosed in Japanese Patent Laid-Open No. 10-274085.

In a conventional apparatus described in that reference, CO in exhaust gas increases as a result of additional injection during the expansion stroke, and desorption of NOx from the lean NOx catalyst and deoxidization of that NOx are promoted. However, since additional injection is done during the expansion process in addition to main injection of fuel in an amount corresponding to the required torque of an engine, and fuel injected by this additional injection is exclusively used to produce CO for desorption and deoxidization of NOx from the lean NOx catalyst, fuel economy readily suffers.

In addition to this catalyst regeneration technique that desorbs adsorbed NOx to increase the NOx amount adsorbed by the catalyst, the present applicant has also proposed a technique for supplying CO upon regenerating the NOx catalyst polluted by SOx in exhaust by heating it to high temperatures so as to maintain performance of the NOx catalyst for a long period of time.

SUMMARY OF THE INVENTION

The present invention has been made in consideration of the above situation, and has as its object to provide a control apparatus for a direct injection engine, which can efficiently regenerate a lean NOx catalyst that adsorbs NOx, and can improve the regeneration effect while suppressing a drop in fuel economy.

In order to achieve the above object, the first invention is a control apparatus for a direct injection engine, which comprises an injector for directly injecting fuel into a combustion chamber, performs lean combustion by setting an air-fuel ratio higher than a stoichiometric air-fuel ratio in a low-load range of the engine, and comprises a lean NOx catalyst that adsorbs NOx in an excess oxygen atmosphere and releases NOx as an oxygen concentration decreases, comprising: air-fuel ratio changing means for changing the air-fuel ratio between an air-fuel ratio higher than the stoichiometric air-fuel ratio to an air-fuel ratio substantially equal to or less than the stoichiometric air-fuel ratio; exhaust gas recirculation means for recirculating some exhaust gas to an intake system; and control means for, when the air-fuel ratio is changed from the air-fuel ratio higher than the stoichiometric air-fuel ratio to the air-fuel ratio substantially equal to or less than the stoichiometric air-fuel ratio, controlling to divisionally execute fuel injection from the injector in at least two injections including leading injection which starts within an intake stroke period, and trailing injection which starts within a compression stroke period, and controlling the exhaust gas recirculation means to recirculate the exhaust gas so as to implement catalyst regeneration control.

In the first invention, the trailing injection in the catalyst regeneration control preferably starts within a duration of a middle period of the compression stroke (second invention).

According to the apparatus of this invention, the catalyst regeneration control is done when the air-fuel ratio has changed from a lean air-fuel ratio to the rich side, and during the catalyst regeneration control, an air-fuel ratio substantially equal to or lower than a stoichiometric air-fuel ratio is set, and divided injection is done in intake and compression strokes. For this reason, the CO amount in exhaust increases while assuring combustion stability, and NOx emission from the engine decreases by exhaust gas recirculation. Hence, the CO amount becomes relatively larger than the NOx amount as the sum of NOx released from the lean NOx catalyst upon catalyst regeneration and NOx in exhaust gas, thus promoting NOx desorption and deoxidization.

Also, in the first or second invention, the leading injection in the catalyst regeneration control preferably starts within a former half of the intake stroke (third invention). With this control, fuel injected by leading injection is sufficiently dispersed, and its vaporization and atomization are promoted, thus improving combustion stability.

Also, an injection amount of the leading injection in the catalyst regeneration control can be set to be not less than ¼ a total injection amount (fourth invention). In this way, fuel injected by leading injection effectively contributes to combustion.

Especially, injection amounts of the leading and trailing injections in the catalyst regeneration control are preferably set to be substantially equal to each other (fifth invention). With this invention, the combustion stability effect of leading injection and the CO increase effect of trailing injection can be satisfactorily obtained. In a very-low load range with a small fuel supply amount, since the divided injection amounts approach a minimum controllable injection amount (minimum pulse width), if different amounts of fuel are injected by leading and trailing injections, the smaller injection amount may fall below the minimum injection amount. However, if equal injection amounts are set, such situation can be avoided.

In one of the first to fifth inventions, when the air-fuel ratio changing means is constructed to set the air-fuel ratio to be substantially equal to or less than the stoichiometric air-fuel ratio in an operating range on a higher-load side than an operating range in which lean combustion is made, and to change the air-fuel ratio in correspondence with a change in running state, the catalyst regeneration control can be done when the operating range shifts from the operating range in which lean combustion is made to the operating range in which the air-fuel ratio is set to be substantially equal to or less than the stoichiometric air-fuel ratio (sixth invention).

With this invention, when the operating range shifts from that for lean combustion to that at substantially the stoichiometric air-fuel ratio or less as a result of a change in accelerator opening, the catalyst is effectively regenerated.

In this case, when the operating range shifts from the operating range in which lean combustion is made to the operating range in which the air-fuel ratio is set to be substantially equal to or less than the stoichiometric air-fuel ratio, intake/compression divided injection including leading information which starts within the intake stroke period and trailing injection which starts within the compression stroke period may be done for a predetermined period of time, and fuel injection may then be divisionally done within the intake stroke period (seventh invention).

With this invention, when catalyst regeneration has progressed to a satisfactory level by intake/compression divided injection, and the CO amount required for desorption and deoxidization of NOx is decreased to some extent, divided injection during the intake stroke period is started, thus improving fuel economy and the like.

In one of the first to seventh inventions, when an NOx adsorption amount of the lean NOx catalyst becomes not less than a predetermined value during lean combustion, the air-fuel ratio may be changed to be equal to or less than the stoichiometric air-fuel ratio, and regeneration control may be done (eighth invention).

With this invention, even when lean combustion continues for a long period of time, the catalyst can be regenerated effectively.

In this case, when the NOx adsorption amount of the lean NOx catalyst becomes not less than a predetermined value during lean combustion, the air-fuel ratio may be changed to be equal to or less than the stoichiometric air-fuel ratio, intake/compression divided injection including leading injection which starts within the intake stroke period and trailing injection which starts within the compression stroke period may be done for a first setting time, combined injection or divided injection may be done within the intake stroke period for a second setting time, and the engine may then return to lean combustion (ninth invention).

With this invention, when catalyst regeneration has progressed to a satisfactory level by intake/compression divided injection, and the CO amount required for desorption and deoxidization of NOx is decreased to some extent, combined injection or divided injection during the intake stroke period is started, thus improving fuel economy and the like.

The 10th invention is a control apparatus for a direct injection engine, which comprises an injector for directly injecting fuel into a combustion chamber, performs lean combustion by setting an air-fuel ratio higher than a stoichiometric air-fuel ratio in a low-load range of the engine, and comprises a lean NOx catalyst that adsorbs NOx in an excess oxygen atmosphere and releases NOx as an oxygen concentration decreases, comprising: air-fuel ratio changing means for changing the air-fuel ratio between an air-fuel ratio higher than the stoichiometric air-fuel ratio to an air-fuel ratio substantially equal to or less than the stoichiometric air-fuel ratio; and control means for, when the air-fuel ratio is changed from the air-fuel ratio higher than the stoichiometric air-fuel ratio to the air-fuel ratio substantially equal to or less than the stoichiometric air-fuel ratio, controlling to divisionally execute fuel injection from the injector in at least two injections including leading injection which starts within an intake stroke period, and trailing injection which starts within a compression stroke period, and controlling to retard the ignition timing of the engine from the ignition timing of MBT (controlling the ignition timing of the engine to be later than the ignition timing of MBT). MBT is the omission of Minimum advance for Best Torque.

In the apparatus of this invention, the trailing injection in the catalyst regeneration control preferably starts within a duration of a middle period of the compression stroke (11th invention).

According to the apparatus of this invention, the catalyst regeneration control is done when the air-fuel ratio has changed from a lean air-fuel ratio to the rich side, and during the catalyst regeneration control, an air-fuel ratio substantially equal to or lower than a stoichiometric air-fuel ratio is set, and divided injection is done in intake and compression strokes. For this reason, the CO amount in exhaust increases while assuring combustion stability, and NOx emission from the engine decreases since the ignition timing is retarded. Hence, the CO amount becomes relatively larger than the NOx amount as the sum of NOx released from the lean NOx catalyst upon catalyst regeneration and NOx in exhaust gas, thus promoting desorption and deoxidization of NOx.

Accordingly, the present invention increases the amount of CO for promoting the regeneration of the lean NOx catalyst by setting the trailing injection timing within the compression stroke in which the ignition timing is short and the vaporization and atomization of fuel is deteriorated relatively. Further the present invention improves combustion stability during a recirculation of exhaust gas by setting the injection start timing of the trailing injection within a middle period of the equally divided three period of compression stroke where piston speed is higher so as to urge a mixture of air and fuel of the trailing injection in the compression stroke on The trailing injection timing set within the compression stroke.

Further, the lean NOx catalyst is refreshed (hereinafter referred to as "regenerated") by releasing and reducing its absorbed NOx from the lean NOx catalyst so as to increase allowable absorbing amount of NOx.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4 is an explanatory view showing range setups of operating modes used in arithmetic operations of a fuel injection amount and the like;

DETAILED DESCRIPTION OF THE PREFERRED EMBODIMENT

Preferred embodiments of the present invention will be described hereinafter with reference to the accompanying drawings.

Figure 1:
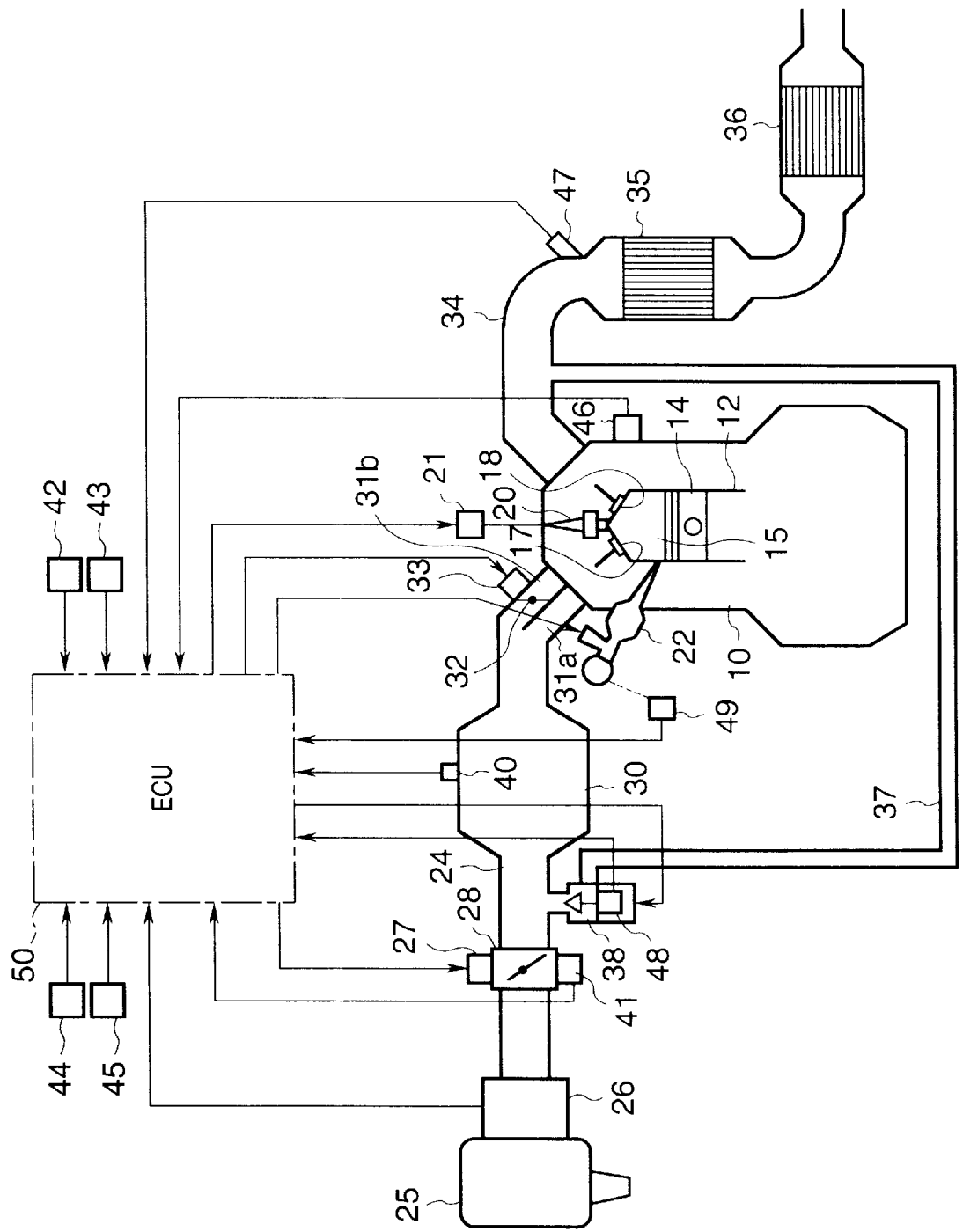
FIG. 1 is a schematic view showing the overall arrangement of an apparatus according to one embodiment of the present invention.

FIG. 1 schematically shows the overall structure of a direct injection engine to which the present invention is applied. Referring to FIG. 1, an engine main body 10 has a plurality of cylinders 12, in each of which a combustion chamber 15 is formed above a piston 14 inserted into its cylinder bore. Intake and exhaust ports open to the combustion chamber 15, and are respectively opened/closed by intake and exhaust valves 17 and 18.

A spark plug 20 is placed at the center of the combustion chamber 15, and its leading end projects into the combustion chamber 15. The leading end portion of an injector 22 projects into the combustion chamber 15 from the sideways, and the injector 22 directly injects fuel into the combustion chamber 15. A fuel circuit, which comprises a high-pressure fuel pump, pressure regulator, and the like, is connected to the injector 22 to supply fuel to the injector 22 of each cylinder, and is designed so that the fuel pressure is set at a predetermined pressure higher than the in-cylinder pressure in the compression stroke.

Intake and exhaust paths 24 and 34 are connected to the engine main body 10. An air cleaner 25, an air flow sensor 26 serving as an intake air amount detection means, a throttle valve 28 driven by a motor 27, and a surge tank 30 are provided in turn from the upstream side in the intake path 24, and the throttle valve 28 and the motor 27 that drives the valve 28 construct an intake air amount adjustment means.

Independent intake paths are formed on the downstream side of the surge tank 30, and communicate with the corresponding intake ports. In this embodiment, the downstream side portion of each independent intake path branches into first and second paths 31a and 31b, two intake ports on their downstream open to the combustion chamber, and a control valve 32 for swirl production (to be referred to as an S valve 32 hereinafter) is inserted in the second path 31b.

The S valve 32 is driven to open/close by an actuator 33. When the second path 31b is closed by the S valve 32, swirl is produced in the combustion chamber 15 by intake air that has passed through the first path 31a, and is weakened as the S valve 32 is gradually opened.

A three-way catalyst 35 and lean NOx catalyst 36 for exhaust gas purification are inserted in the exhaust path 34. As is generally known, the three-way catalyst 35 has high purification performance against HC, CO, and NOx around a stoichiometric air-fuel ratio.

The lean NOx catalyst 36 has NOx purification performance even during lean combustion in which the air-fuel ratio is leaner than the stoichiometric air-fuel ratio. That is, the lean NOx catalyst 36 adsorbs NOx in exhaust gas in an excess oxygen atmosphere, and when the air-fuel ratio has changed toward the rich side and the oxygen concentration has decreased, the catalyst 36 releases adsorbed NOx and reduces NOx by a deoxidizing agent such as CO or the like present in the atmosphere.

More specifically, the lean NOx catalyst 36 has an NOx adsorption layer as a lower (inner) layer and catalytic layer as an upper (outer) layer formed on a carrier consisting of a cordierite honeycomb structure or the like. The NOx adsorption layer has as its major component activated alumina which has a large specific surface area and carries Pt components and Ba components as an NOx adsorption material. On the other hand, the catalytic layer has as its major component a catalytic material obtained by carrying Pt and Rh components on zeolite as a carrier matrix. Note that a ceria layer may be formed on the catalytic layer.

Furthermore, an EGR device (exhaust gas recirculation means) for recirculating some exhaust gas to an intake system is inserted between the exhaust and intake paths 34 and 24. This EGR device comprises an EGR path 37 that connects the exhaust and intake paths 34 and 24, and an EGR valve 38 inserted in the EGR path 37. The EGR valve 38 is driven to open/close by an actuator 39 (see FIG. 5).

In addition to the air flow sensor 26, this engine is equipped with various sensors such as a boost sensor 40 for detecting the negative intake pressure in the surge tank 30, a throttle opening sensor 41 for detecting throttle opening, an engine speed sensor 42 for detecting engine speed, an accelerator opening sensor 43 for detecting accelerator opening (accelerator pedal stroke), an intake temperature sensor 44 for detecting intake temperature, an atmospheric pressure sensor 45 for detecting atmospheric pressure, a water temperature sensor 46 for detecting engine cooling water temperature, an $O_2$ sensor 47 for detecting an air-fuel ratio by detecting the oxygen concentration in exhaust gas, an EGR valve lift sensor 48 for detecting the lift amount of the EGR valve, a fuel pressure sensor 49 for detecting fuel pressure given to the injector 22, and the like. The output signals (detection signals) from those sensors are input to an ECU (control unit) 50.

The ECU 50 controls the fuel injection amount and timing from the injector 22, and also controls the throttle valve 28 by outputting a control signal to the motor 27 that drives the throttle valve 28. Furthermore, the ECU 50 controls the ignition timing by outputting a control signal to an ignition circuit 21, and controls the EGR valve 38 by outputting a control signal to the actuator 39. Note that the ECU 50 controls the S valve 32 and the like in addition to these control processes.

As basic control of the direct injection engine of this embodiment, various operating modes with different fuel injection timings from the injector 22, air-fuel ratios, and the like are selectable, and the operating modes are changed in correspondence with operating ranges.

More specifically, a predetermined range on the low-load/low-speed side is a stratified combustion range, and the remaining range is a uniform combustion range (see FIG. 3), as will be described later. In the stratified combustion range, a stratified combustion mode is set. In this mode, since the injector 22 injects fuel in the latter half of the compression stroke, stratified combustion takes place with fuel mixture present only near the spark plug 20. In this case, the throttle valve 28 is set at a large opening to increase the intake air amount, thus setting the air-fuel ratio in the combustion chamber as a whole to be a very lean ratio (e.g., 30 or more). On the other hand, in the uniform combustion range, a uniform combustion mode is set. In this mode, since the injector 22 starts fuel injection in the former half of the intake stroke, combustion takes place with fuel mixture uniformly dispersed in the entire combustion chamber 15. In this uniform combustion, an excessive air ratio $\lambda$ is set at $\lambda=1$, i.e., a stoichiometric air-fuel ratio (A/F=14.7) is set.

Figure 2:
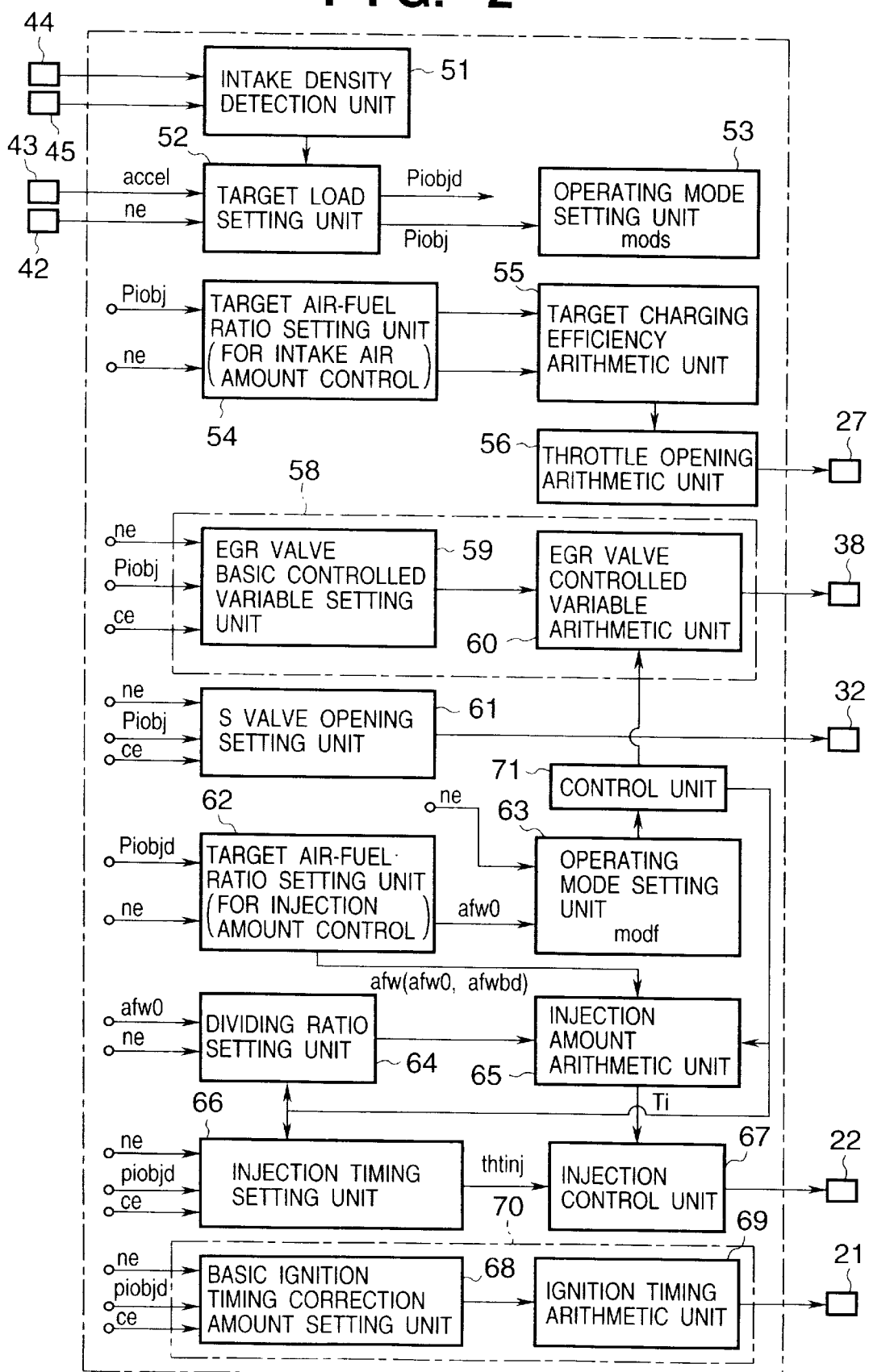
FIG. 2 is a block diagram showing the functional arrangement of an ECU.

FIG. 2 shows the arrangement of means functionally included in the ECU 50. The ECU 50 has an intake density detection unit 51 for detecting the intake density on the basis of the signals from the intake temperature sensor 44 and atmospheric pressure sensor 45, and also has a target load setting unit 52 for setting a value corresponding to a target load on the basis of the signals from the accelerator opening sensor 43 and engine speed sensor 42 in consideration of the intake density.

The target load setting unit 52 obtains, as virtual charging efficiency, charging efficiency corresponding to an engine torque required upon a standard operating condition that keeps the air-fuel ratio at the stoichiometric air-fuel ratio, on the basis of virtual volumetric efficiency, which is obtained from a map in correspondence with accelerator opening accel and engine speed ne, and the intake density, and obtains based on the virtual charging efficiency a target indicated mean effective pressure as a value corresponding to the virtual charging efficiency to set it as a target load.

Note that the virtual volumetric efficiency is volumetric efficiency that can obtain output performance required in a standard air state and under the standard operating condition that keeps the air-fuel ratio at the stoichiometric air-fuel ratio. Correspondence among the accelerator opening, engine speed, and virtual volumetric efficiency is defined in advance by bench tests, and the like, and is stored as a map in the internal memory of the ECU 50.

The target load setting unit 52 obtains first target indicated mean effective pressure Piobj by predetermined computation upon obtaining the target indicated mean effective pressure from the virtual charging efficiency, while it sets a blunt virtual charging efficiency and obtains second target indicated mean effective pressure Piobjd from the blunt virtual charging efficiency.

Figure 3:
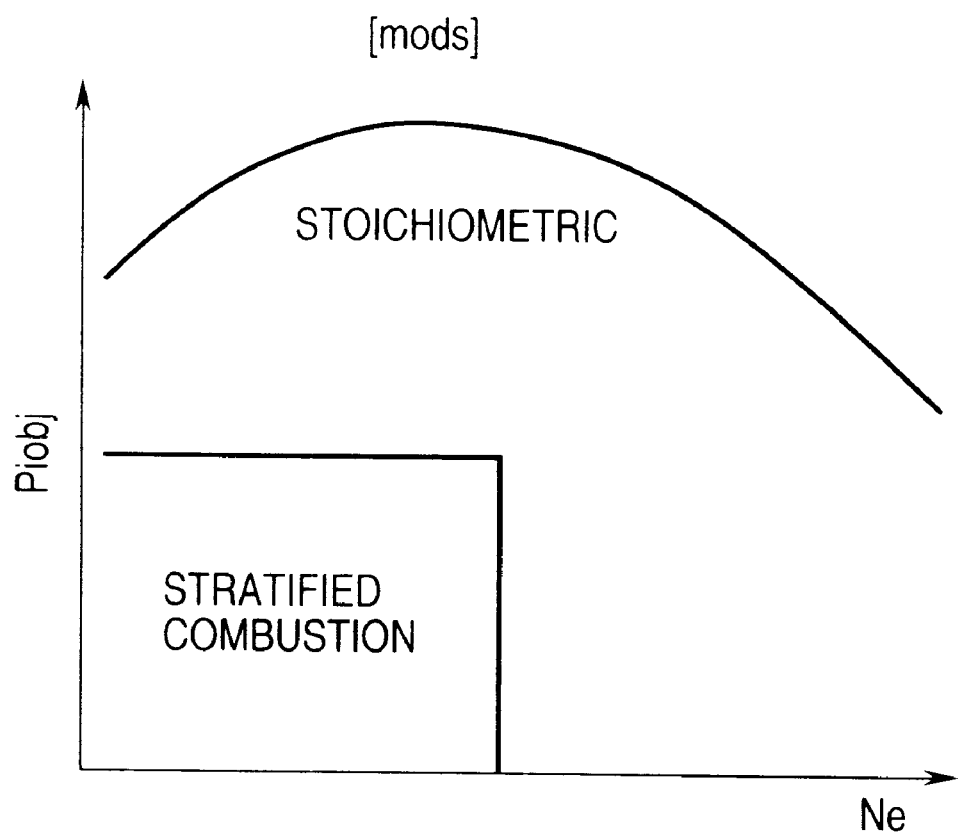
FIG. 3 is an explanatory view showing range setups of operating modes.

The ECU 50 also has an operating mode setting unit 53 for setting basic operating mode mods. The operating mode setting unit 53 sets basic operating mode mods in accordance with first target indicated mean effective pressure piobj and engine speed ne. More specifically, as shown in FIG. 3, in a range in which first target indicated mean effective pressure Piobj is lower than a predetermined low-load side threshold value and the engine speed is low (stratified combustion range), the stratified combustion mode is set, and in a range on the higher load, higher rotational speed side of that range (uniform combustion range), the uniform combustion mode with $\lambda=1$ (to be referred to as a stoichiometric mode hereinafter) is set. Of the uniform combustion range, in a full open accelerator range or a high-load, high-rotational speed range near that range, the air-fuel ratio may be set to be richer ($\lambda<1$) than the stoichiometric air-fuel ratio.

Furthermore, the ECU 50 determines various control parameter values that pertain to the engine output in accordance with the target load and the like. In this embodiment, the control parameters include an intake air amount adjusted by the throttle valve 28, an EGR amount adjusted by the EGR valve 38, swirl adjusted by the S valve 32, a fuel injection amount and fuel injection timing from the injector 22, and the ignition timing of the spark plug 20, and these control parameter values are determined in accordance with the target load, engine speed ne, and the like. In this case, first target indicated mean effective pressure Piobj is used as a target load for determining the control parameters of a low-speed response system of the control parameters, and second target indicated mean effective pressure Piobjd is used as a target load for determining the control parameters of a high-speed response system.

That is, of the above control parameters, the intake air amount, EGR amount, and swirl are included in the low-speed response system which responds relatively slowly to operations of the throttle valve 28, EGR valve 38, and S valve 32, and throttle opening tvoobj, controlled variable egrobj of the EGR valve 38, and an opening of S valve 32 as their controlled variables are determined in accordance with first target indicated mean effective pressure Piobj, engine speed ne, and the like. On the other hand, the fuel injection amount, fuel injection timing, and ignition timing are included in the high-speed response system which quickly responds to control signals, and are determined in accordance with second target indicated mean effective pressure Piobjd, engine speed ne, and the like.

More specifically, the ECU 50 has a target air-fuel ratio setting unit 54, target charging efficiency arithmetic unit 55, and throttle opening arithmetic unit 56 as means for intake air amount control. The target air-fuel ratio setting unit 54 sets target air-fuel ratio afwb for intake air amount control in units of operating modes set by the operating mode setting unit 53. The unit 54 obtains target air-fuel ratio afwb from a map prepared in advance in accordance with first target indicated mean effective pressure Piobj and engine speed ne in the stratified combustion mode, and sets target air-fuel ratio afwb at the stoichiometric air-fuel ratio in the stoichiometric mode.

The target charging efficiency arithmetic unit 55 obtains target charging efficiency from virtual charging efficiency ceimg and target air-fuel ratio afwb above. In this case, in lean combustion, the unit 55 obtains target charging efficiency in consideration of the target air-fuel ratio corresponding to the excessive air ratio (afwb/14.7) and fuel economy improvement effect. That is, virtual charging efficiency ceimg is a value corresponding to the target load in a state wherein the engine runs at the stoichiometric air-fuel ratio. By contrast, in order to assure equivalent fuel injection amount in lean combustion, the excessive air ratio must be taken into consideration. However, in this case, since thermal efficiency increases and fuel economy improves, the torque becomes higher than that at the stoichiometric air-fuel ratio accordingly. Hence, in order to obtain a torque corresponding to the target load, the target charging efficiency is corrected in the minus direction in correspondence with the excessive air ratio.

The throttle opening arithmetic unit 56 obtains target volumetric efficiency from the target charging efficiency in consideration of intake density correction, and determines throttle opening in accordance with this target volumetric efficiency and engine speed ne. In this case, since the correspondence among the volumetric efficiency, engine speed, and throttle opening varies depending on the presence/absence of EGR, maps indicating such correspondences are prepared in advance for both the cases, and the throttle opening can be obtained in accordance with the target volumetric efficiency, which is obtained from either of these maps in accordance with the discrimination result of the presence/absence of EGR by an EGR discrimination unit.

As means for EGR amount control, the ECU 50 has an EGR valve control unit 58 which has an EGR valve basic controlled variable setting unit 59 and EGR valve controlled variable arithmetic unit 60. The EGR valve basic controlled variable setting unit 59 sets basic controlled variable pbase of the EGR valve 38 in correspondence with operating modes mods set by the operating mode setting unit 53. That is, the unit 59 obtains basic controlled variable pbase from a map prepared in advance in accordance with first target indicated mean effective pressure Piobj and engine speed ne in the stratified combustion mode, and obtains the basic controlled variable from a map prepared in advance in accordance with actual charging efficiency ce obtained based on the output from the air flow sensor 26, and engine speed ne in the stoichiometric mode.

The EGR valve controlled variable arithmetic unit 60 obtains a final EGR valve controlled variable in consideration of various kinds of correction of the basic controlled variable.

As means for S valve opening control, the ECU 50 has an S valve opening setting unit 61. The S valve opening setting unit 61 sets S valve opening in units of operating modes mods set by the operating mode setting unit 53 so as to obtain swirl required in each mode. The unit 61 obtains S valve opening scvobj from a map prepared in advance in accordance with first target indicated mean effective pressure Piobj and engine speed ne in the stratified combustion mode, and obtains it from a map prepared in advance in accordance with actual charging efficiency ce and engine speed ne in the stoichiometric mode.

As means for controlling fuel injection from the injector 22, the ECU 50 has a target air-fuel ratio generation unit 62, operating mode setting unit 63, dividing ratio setting unit 64, injection amount arithmetic unit 65, injection timing setting unit 66, and injection control unit 67.

The target air-fuel ratio generation unit 62 obtains a target air-fuel ratio used in control of the fuel injection amount or the like. More specifically, the unit 62 obtains target air-fuel ratio afw0 which is mainly used in a transient state, and target air-fuel ratio afwbd which is mainly used in a steady state, and determines final target air-fuel ratio afw by selecting one of these air-fuel ratios afw0 and afwbd.

Target air-fuel ratio afw0 which is mainly used in a transient state is obtained based on second target indicated mean effective pressure Piobjd or corresponding virtual charging efficiency, and actual charging efficiency ce in consideration of the fuel economy improvement effect, so as to obtain a torque corresponding to the target load at the actual charging efficiency. On the other hand, target air-fuel ratio afwbd which is mainly used in a steady state is obtained from a map prepared in advance in accordance with second target indicated mean effective pressure Piobjd and engine speed ne in the stratified combustion mode, and is set at the stoichiometric air-fuel ratio ($\lambda=1$) in the stoichiometric mode.

The target air-fuel ratio generation unit 62 computes deviation dafwb between target air-fuel ratio afwb for intake air amount control and target air-fuel ratio afw0, which is computed as described above, selects target air-fuel ratio afw0 as final target air-fuel ratio afw in the transient state with increasing deviation dafwb, and selects target air-fuel ratio afwbd as final target air-fuel ratio afw in a steady state with small deviation dafwb.

The target air-fuel ratio generation unit 62 and the above target air-fuel ratio setting unit 54 build an air-fuel ratio changing unit that changes the air-fuel ratio from an air-fuel ratio higher than the stoichiometric air-fuel ratio to that substantially equal to or lower than the stoichiometric air-fuel ratio.

Figure 4:
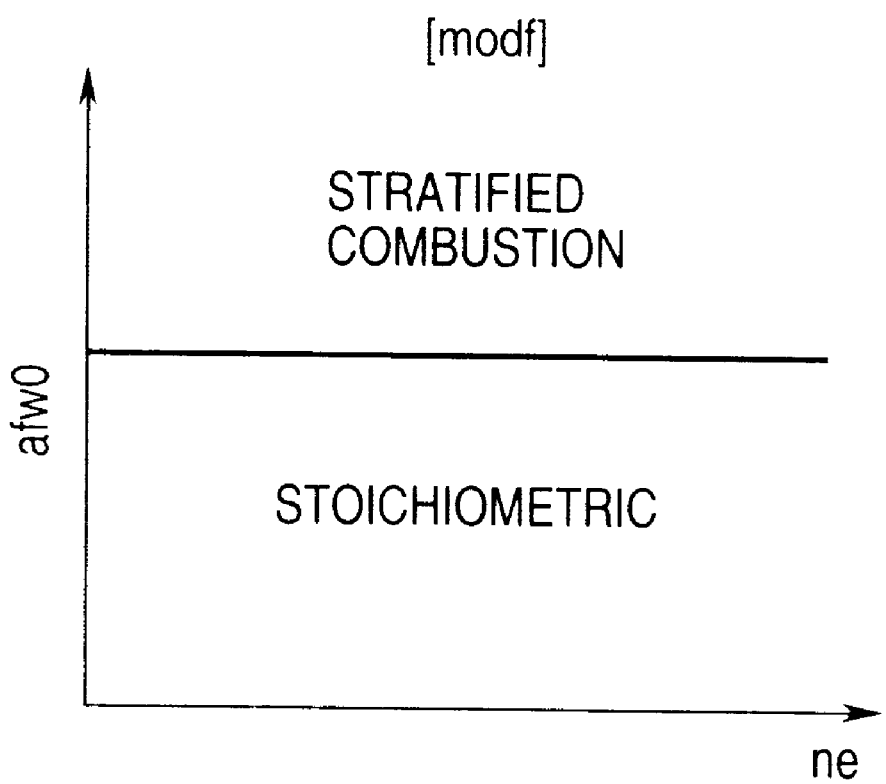

The operating mode setting unit 63 sets operating mode modf used to determine the control parameters of the high-speed system in accordance with target air-fuel ratio afw0 for fuel injection amount control, as shown in, e.g., FIG. 4. More specifically, when target air-fuel ratio afw0 assumes a value larger than a stratified combustion lower-limit reference value (e.g., around 19), the unit 63 sets the stratified combustion mode; otherwise, it sets the stoichiometric mode.

The dividing ratio setting unit 64 sets the dividing ratio of intake stroke injection and compression stroke injection in accordance with operating mode modf set by the operating mode setting unit 63. The unit 64 sets 0% intake stroke injection ratio (compression stroke injection ratio=100%) in the stratified combustion mode, and sets 100% intake stroke injection ratio (compression stroke injection ratio=0%) in the stoichiometric mode. When divided injection (to be described later) is done, the unit 64 sets the injection ratio accordingly.

The injection amount arithmetic unit 65 computes fuel injection amount in accordance with actual charging efficiency ce obtained from the output of the air flow sensor 26, target air-fuel ratio afw obtained by target air-fuel ratio generation unit 62, and the injection ratio set by the dividing ratio setting unit 64. In this case, the unit 65 computes basic injection amount (that for each injection in case of divided injection) in accordance with actual charging efficiency ce and target air-fuel ratio afw, then computes final injection amount in consideration of a correction value corresponding to the fuel pressure and various other correction values, and finally obtains an injection pulse width proportional to this final injection amount.

The injection timing setting unit 66 sets fuel injection timing thtinj in units of operating modes set by the operating mode setting unit 63. The unit 66 obtains an injection timing for compression stroke injection from a map prepared in advance in accordance with second target indicated mean effective pressure Piobjd and engine speed ne in the stratified combustion mode, and obtains an injection timing for intake stroke injection from a table prepared in advance in accordance with engine speed ne in the stoichiometric mode.

The injection control unit 67 outputs an injection pulse to activate the injector 22 for a time corresponding to injection pulse width Ti computed by the injection amount arithmetic unit at the injection timing set by the injection timing setting unit 66.

As means for controlling the ignition timing, the ECU 50 has an ignition timing control unit 70 having a setting unit 68 for setting a basic ignition timing and correction amount, and an ignition timing arithmetic unit 69.

The setting unit 68 sets a basic ignition timing and various ignition timing correction values in units of operating modes modf set by the operating mode setting unit 63, and the ignition timing arithmetic unit 69 computes ignition timing on the basis of the basic ignition timing and various ignition timing correction values set by the setting unit 68.

The ECU 50 has a control unit 71 for catalyst regeneration control, in addition to the aforementioned units.

Figure 5:
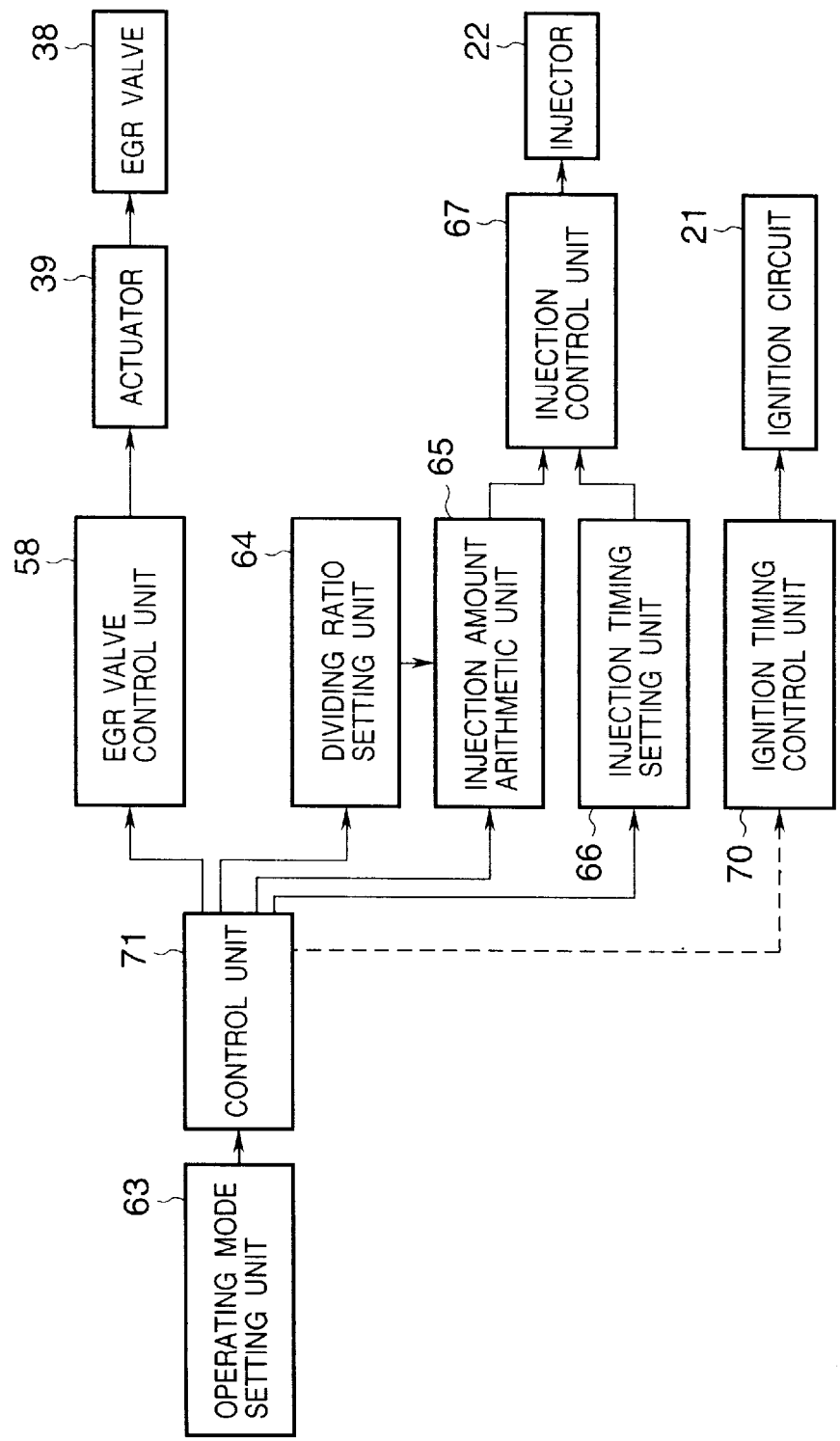
FIG. 5 is a partial block diagram of units that pertain to catalyst regeneration control in FIG. 2.

This control unit 71 makes the following fuel injection control for catalyst regeneration via the dividing ratio setting unit 64, injection amount arithmetic unit 65, injection timing setting unit 66, and the like, and controls the EGR control unit 58, when the operating mode has been switched from the stratified combustion mode to the stoichiometric mode on the basis of setups by the operating mode setting unit 63, as also shown in FIG. 5.

Figure 6:
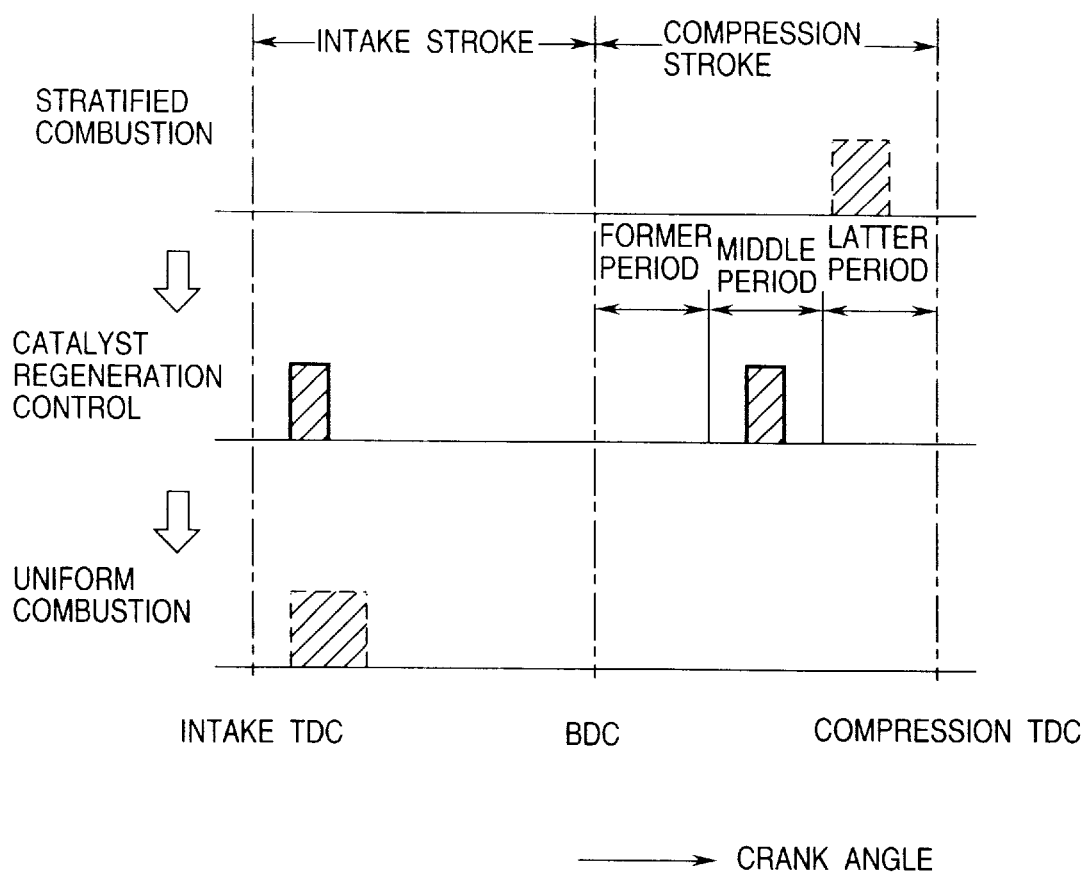
FIG. 6 is an explanatory view showing the fuel injection timings.

More specifically, as the catalyst regeneration control, the control unit 71 controls fuel injection from the injector 22 to divide it into at least two injections, i.e., leading injection in an intake stroke period and trailing injection in a compression stroke period for only a predetermined period of time after the stoichiometric mode is selected. At this time, as shown in FIG. 6, the unit 71 sets the injection timings of the individual injections so as to start leading injection within a duration of the former half (from the intake top dead center to 90° after the intake top dead center) of the former and latter halves of the intake stroke, and to start trailing injection within a duration of the middle period (120° before the compression top dead center to 60° before the compression top dead center) of the former, middle, and latter periods of the compression stroke. Also, the injection amount of leading injection is set to be ¼ or more the total injection amount and, preferably, the injection ratio of the individual injections is set so that the injection amounts of leading and trailing injections are substantially equal to each other. Also, the injection amount is adjusted to set the air-fuel ratio at substantially the stoichiometric air-fuel ratio or slightly richer.

Furthermore, the control unit 71 controls the EGR valve control unit 58 to make EGR upon catalyst regeneration control. More specifically, EGR is done with a relatively large amount in the stratified combustion mode, and EGR continues also in the catalyst regeneration control. In this case, the EGR amount is adjusted not to impair combustion stability.

Note that the control unit 71 may control the ignition timing control unit 70 to retard the ignition timing from the ignition timing of MBT upon catalyst regeneration control.

Figure 7:
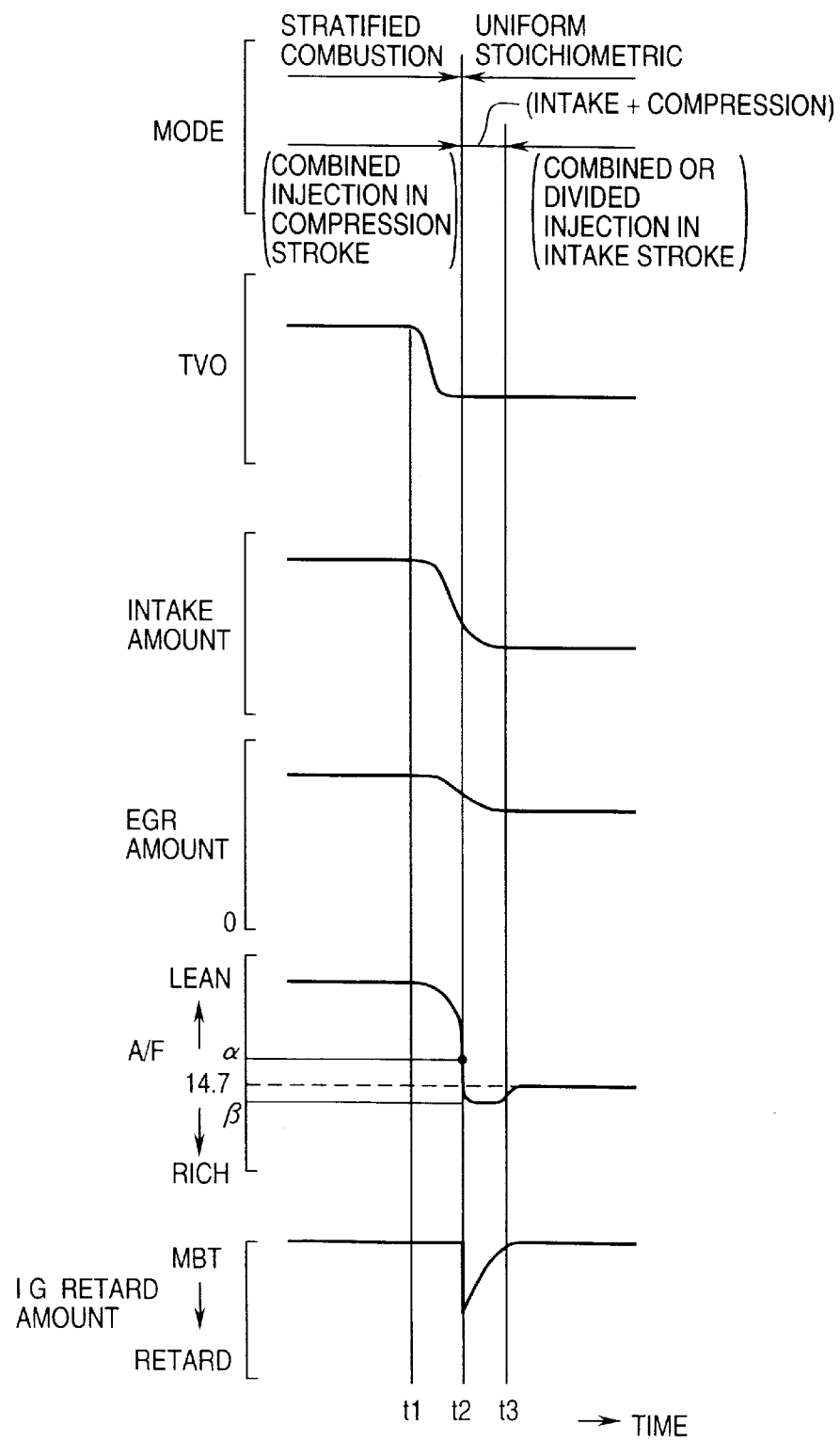
FIG. 7 is a timing chart showing an example of catalyst regeneration control.

FIG. 7 is a timing chart showing an example of the catalyst regeneration control by the control unit 71.

As shown in FIG. 7, when the operating mode shifts from the stratified combustion mode to the stoichiometric mode of uniform combustion due to a change in target load corresponding to a change in accelerator opening, the throttle valve opening (TVO) is controlled in a direction to decrease so as to change the air-fuel ratio by adjusting the intake air amount from timing t1 at which operating mode mods set by the operating mode setting unit 53 has been switched, and the intake air amount changes to decrease with a certain response delay after that control. Then, the actual air-fuel ratio gradually changes in the rich direction by the arithmetic operation of the target air-fuel ratio for injection amount control or the like according to the intake air amount and the like by the target air-fuel ratio generation unit 62, and the corresponding fuel injection amount control. At timing t2 at which that air-fuel ratio has decreased to a predetermined value a (e.g., around 19), operating mode modf set by the operating mode setting unit 53 is switched to the stoichiometric mode.

For a predetermined period of time after timing t2, the air-fuel ratio is set at a value (e.g., about 14) slightly smaller than the stoichiometric air-fuel ratio, and fuel injection from the injector 22 is divisionally done as leading injection which is started within the duration of the former half of the intake stroke, and trailing injection which is started within the duration of the middle period of the compression stroke, thus implementing the catalyst regeneration control.

In the stratified combustion mode, since EGR robustness (combustion stability during EGR) is high, a relatively large amount of EGR is introduced. In the stoichiometric mode, the EGR amount is decreased. In the catalyst regeneration control, a certain EGR amount (smaller than that in the stratified combustion mode but larger than that in the stoichiometric mode) is assured. Furthermore, at timing t2 at which the catalyst regeneration control is started, the ignition timing is retarded from the ignition timing of MBT (that in the state wherein the aforementioned divided injection is done). The retarded injection timing can suppress an abrupt change in torque due to a sudden increase in fuel injection amount that immediately changes the air-fuel ratio below the stoichiometric air-fuel ratio, and promotes catalyst regeneration by decreasing the produced NOx amount.

After timing t3 a predetermined period of time since the beginning of the catalyst regeneration control, fuel injection from the injector 22 is set to be combined injection or divided injection in the intake stroke, the air-fuel ratio changes to the stoichiometric air-fuel ratio, and the ignition timing returns to the ignition timing of MBT as control in the stoichiometric mode.

The operations and effects such as catalyst regeneration promotion and the like by the apparatus of this embodiment will be explained below with reference to FIGS. 8 to 9D.

The lean NOx catalyst 36 adsorbs NOx in exhaust gas at a lean air-fuel ratio, and releases NOx when a richer air-fuel ratio is set. Upon NOx release, if a deoxidizing agent in an atmosphere is insufficient for NOx, NOx cannot be sufficiently reduced, and is exhausted downstream the catalyst. Hence, in order to decrease the NOx exhaust amount upon catalyst regeneration, it is required to sufficiently supply a deoxidizing agent into the catalyst atmosphere and to promote NOx deoxidization. As a deoxidizing agent for NOx, CO is effective, and as the ratio of the CO amount to the NOx amount, i.e., [(CO amount)/(NOx amount)] becomes larger by increasing the CO amount in exhaust gas guided to the lean NOx catalyst 36, the NOx exhaust amount can be decreased downstream the catalyst.

Figure 8:
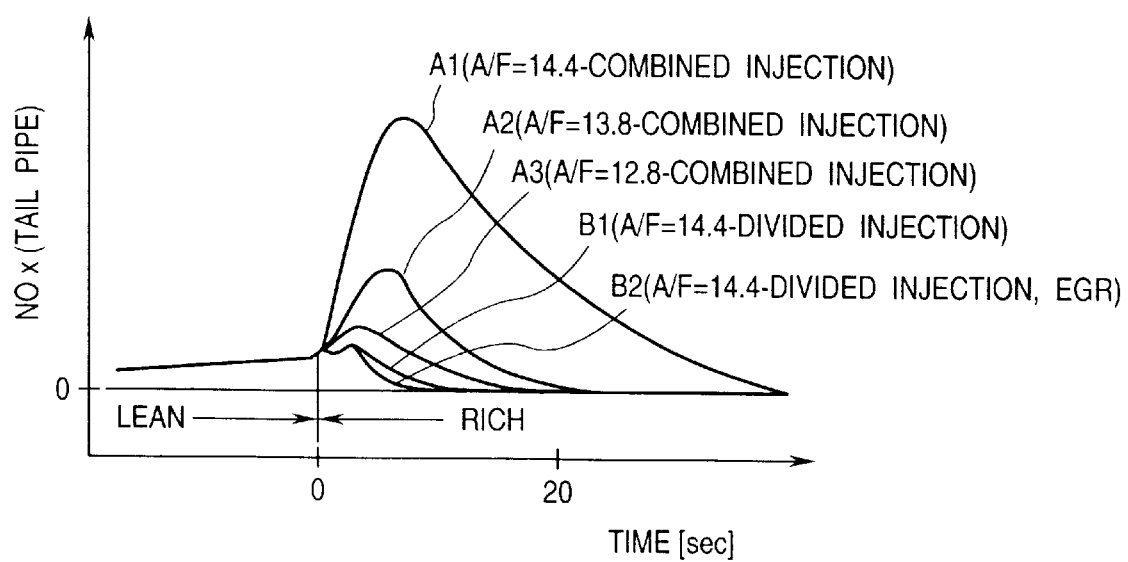
FIG. 8 is a graph showing the NOx exhaust amount in the catalyst regeneration control.
Figure 9A:
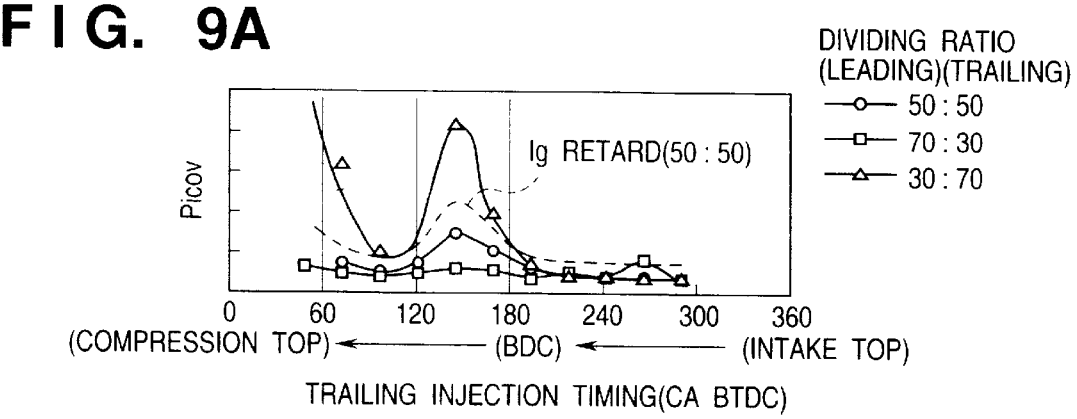
FIGS. 9A to 9D are graphs showing data obtained by examining the Pi variation factor, fuel consumption, and amounts of CO and NOx exhausted from an engine main body while variously changing the trailing injection timing in divided injection.
Figure 9B:
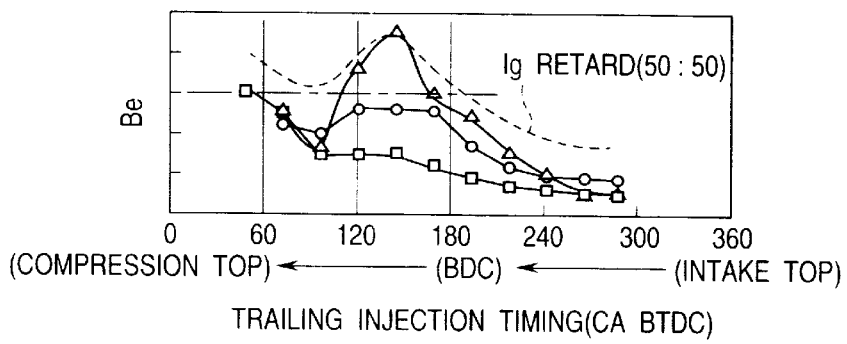
Figure 9C:
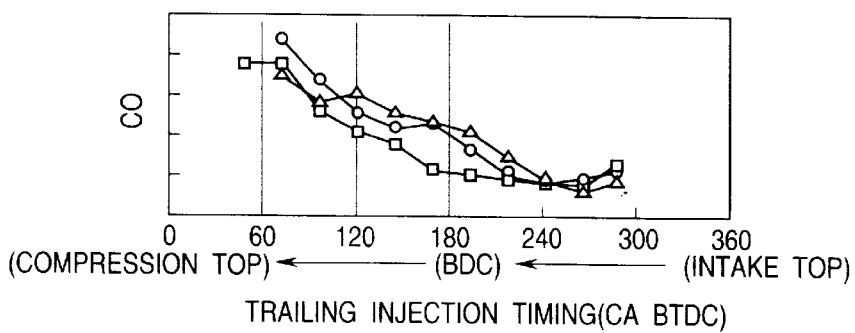
Figure 9D:
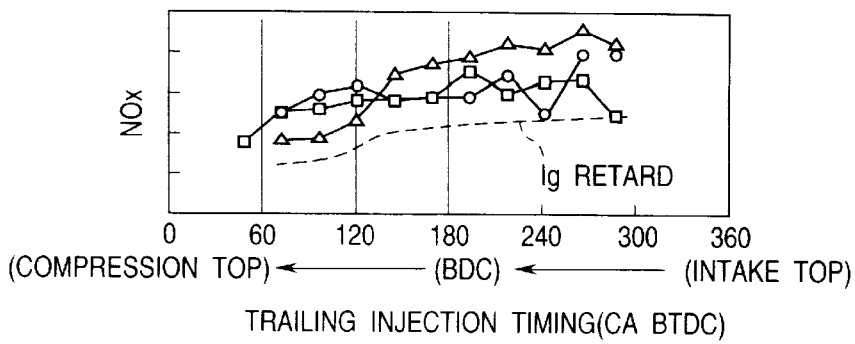

FIG. 8 shows the experimental results of the NOx exhaust amounts (NOx contents in exhaust gas at a tail pipe) obtained when combined injection was done in the rich combustion and when divided injection was done as in this embodiment immediately after the lean combustion had shifted to the rich combustion. In FIG. 8, curves A1 to A3 indicate the NOx exhaust amounts obtained when the fuel injection pattern is combined injection in the intake stroke immediately after rich shift, and when the air-fuel ratio is respectively set at 14.4, 13.8, and 12.8. Curve B1 indicates a case wherein the air-fuel ratio is set at 14.4 immediately after air-fuel ratio shift, and divided fuel injection is done in the intake and compression strokes, and curve B2 indicates a case wherein the air-fuel ratio is set at 14.4 immediately after air-fuel ratio shift, and EGR is done at an EGR ratio=30% in addition to the divided injection.

As shown in FIG. 8, when combinedly injection is done in the intake stroke upon catalyst regeneration, since CO cannot be sufficiently obtained if the air-fuel ratio is as low as around 14.4, the NOx exhaust amount increases downstream the catalyst, and a very rich air-fuel ratio must be set to sufficiently decrease the NOx exhaust amount. By contrast, when divided injection is done, the NOx exhaust amount can be decreased even when the air-fuel ratio is as low as around 14.4. This is because when the divided injection is done, fuel injected by intake stroke injection is dispersed into the entire combustion chamber, while the fuel mixture distribution in the combustion chamber becomes nonuniform to some extent by compression stroke injection. Thus, the CO amount in exhaust increases to increase [(CO amount)/(NOx amount)] while assuring high combustion stability. On the other hand, when EGR is done in addition to divided injection, since NOx in exhaust decreases (and a total NOx amount as a sum of NOx released from the catalyst and NOx in exhaust gas decreases), [(CO amount)/(NOx amount)] becomes large, and NOx emission further decreases.

FIGS. 9A to 9D respectively show data obtained by checking a Pi variation factor (Picov) indicating combustion instability, fuel consumption (Be), the CO amount exhausted from the engine main body, and the NOx amount exhausted from the engine main body while variously changing the trailing injection timing (the injection start timing of trailing injection) in the divided injection. The injection start timing of leading injection in the divided injection is fixed at 20° after the intake top dead center. In the individual graphs shown in FIGS. 9A to 9D, data indicated by the solid curves represent cases wherein the dividing ratios of leading and trailing injections are respectively 50%:50%, 70%:30%, and 30%:70%. On the other hand, data indicated by the broken curves represent cases wherein the dividing ratio is set at 50%:50%, and the ignition timing is retarded.

Note that the abscissa of each of these graphs plots crank angle before the top dead center (CA BTDC), "360° BTDC" corresponds to the intake top dead center, and "180° BTDC" corresponds to the bottom dead center (BDC). Timing becomes earlier toward the right side of the abscissa, and becomes later toward the left side.

As shown in FIGS. 9A to 9D, when the trailing injection timing is set at a relatively late timing in the compression stroke (a timing close to leading injection), high combustion stability and fuel economy are assured, but the amount of CO serving as a deoxidizing agent in catalyst regeneration is small. From the latter half of the intake stroke to the compression stroke, the Pi variation factor and fuel economy improve, and the CO amount increases as the trailing injection timing becomes later. This may be caused by poor dispersion, vaporization, and atomization of fuel due to a short time until ignition when the trailing injection timing becomes later.

As the trailing injection timing becomes later, the CO amount tends to increase until the latter period of the compression stroke, but the Pi variation factor and fuel economy become lower in the middle period of the compression stroke. The reason for this is not necessarily clear, but it may be surmised as follows. That is, since the piston moving speed is high in the middle period of the compression stroke, injected fuel is easily mixed. When the piston is located at a downward position like in the former period of the compression stroke, injected fuel becomes attached to the cylinder wall and unburnt gas is readily produced. But in the middle period of the compression stroke, injected fuel strikes the top of the piston to decrease unburnt gas. Also, the CO amount increases in the middle period of the compression stroke since the time until ignition is shortened although mixing or the like is promoted, and nonuniformity and insufficient vaporization of fuel mixture occur to some extent.

When the trailing injection timing is delayed up to the latter period of the compression stroke, dispersion, vaporization, and atomization of fuel are impaired, thus deteriorating combustion stability and fuel economy again.

As described above, when the trailing injection timing is set to start injection within the duration of the middle period of the compression stroke, the amount of CO serving as a deoxidizing agent upon catalyst regeneration can be increased while assuring high combustion stability and fuel economy. Since the combustion stability is improved, relatively large EGR can be introduced, and the ignition timing can also be retarded. In this manner, when EGR is introduced and the ignition timing is retarded, NOx in exhaust can be decreased.

Therefore, [(CO amount)/(NOx amount)] can be increased and the NOx deoxidization effect can be improved upon catalyst regeneration.

According to the data shown in FIGS. 9A to 9D, the aforementioned effects can be obtained even when the dividing ratio in divided injection is set at any of 50%:50%, 70%:30%, and 30%:70%. Especially, the aforementioned effects can be satisfactorily obtained when leading and trailing injections are set at substantially the same ratio (50%:50%).

In the example shown in FIG. 7, intake/compression divided injection is done upon mode shift, but divided injection may be done in the intake stroke. That is, when divided injection is done in the former and latter halves of the intake stroke, as shown in FIGS. 9A to 9D, since CO can be produced to some extent although it is smaller than that obtained by intake/compression divided injection, and fuel economy can be improved, it is effective to regenerate the catalyst while saving fuel consumption.

Figure 10:
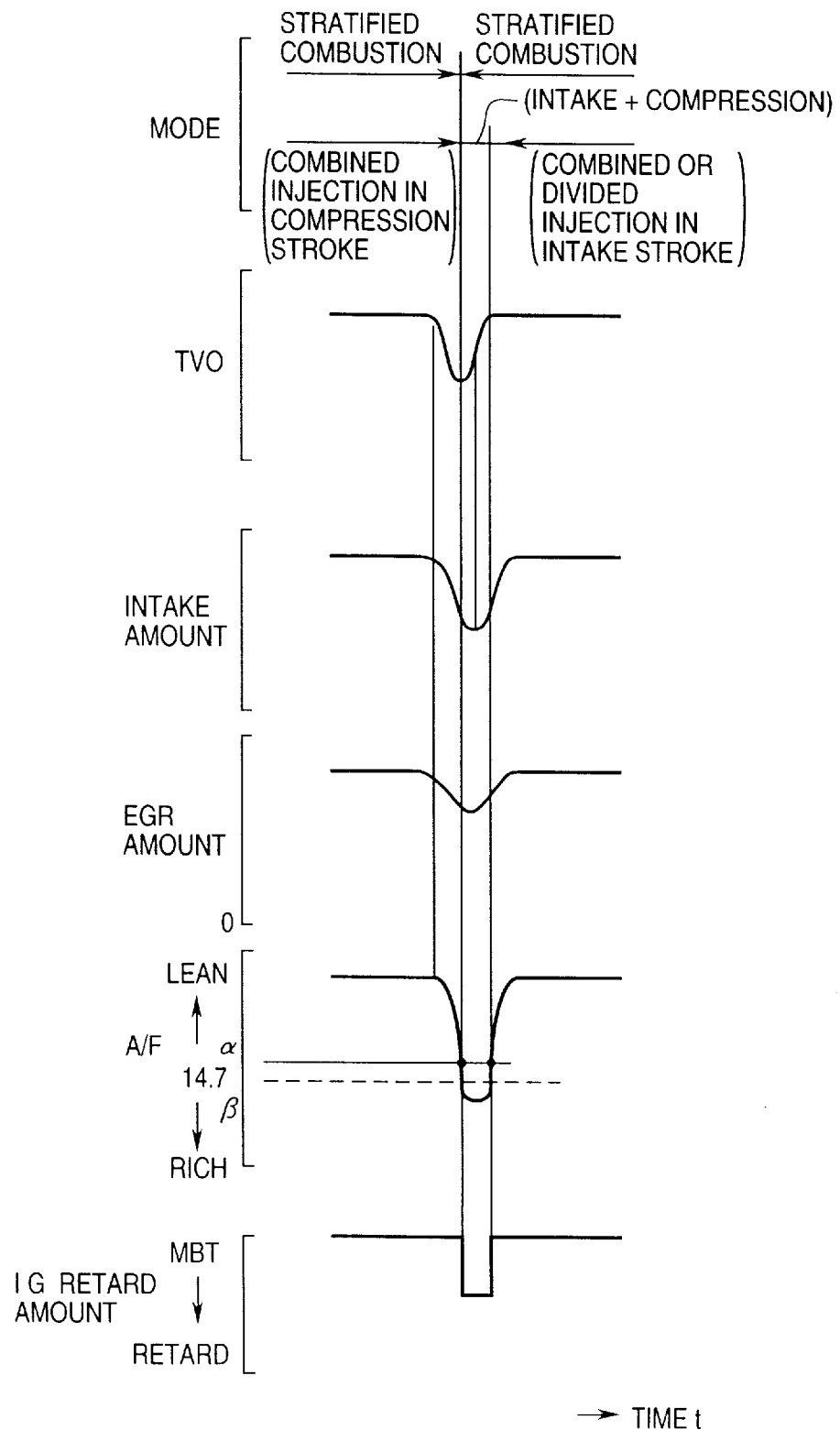
FIG. 10 is a timing chart showing an example of catalyst regeneration control according to another embodiment of the present invention.

FIG. 10 is a timing chart showing an example wherein catalyst regeneration control is done for a predetermined period of time when the NOx adsorption amount of the lean NOx catalyst 36 increases while lean combustion continues, as another embodiment of the present invention.

In this embodiment as well, the engine and ECU are constructed, as shown in FIGS. 1 and 2. But when the control unit 71 for catalyst regeneration detects that the NOx adsorption amount of the lean NOx catalyst has exceeded a predetermined value during lean combustion in the stratified combustion mode, it starts catalyst regeneration. For example, the unit 71 checks the lean combustion duration time or the accumulated value of fuel injection amounts during lean combustion, and when that value has exceeded a predetermined value, the unit 71 starts catalyst regeneration shown in FIG. 10.

More specifically, when it is determined during lean combustion in the stratified combustion mode that the NOx adsorption amount of the lean NOx catalyst has exceeded a predetermined value, the throttle valve opening (TVO) is controlled to decrease so as to set the air-fuel ratio substantially equal to or lower than the stoichiometric air-fuel ratio, and the air intake amount changes in a direction to decrease with a certain response delay after that control. The air-fuel ratio gradually changes in the direction to decrease (rich direction) in correspondence with the change in intake air amount. When the air-fuel ratio has decreased to a predetermined value, the injection pattern is changed from compression stroke combined injection so far to intake/compression divided injection, and the fuel injection amount is controlled to change the air-fuel ratio to a value slightly smaller than the stoichiometric air-fuel ratio.

In this case, as in the aforementioned regeneration control upon mode shift shown in FIG. 7, the injection timings are controlled so that intake/compression divided injection is done in the duration of the former half of the intake stroke and the duration of the middle period of the compression stroke, and the ratio between the injection amounts of leading and trailing injections is appropriately adjusted.

Especially, in the regeneration control in a very-low load range, the injection amounts of leading and trailing injections are preferably set to be substantially equal to each other in terms of control. That is, upon divided injection in a very-low load range with a small fuel supply amount, since the divided injection amounts approach a minimum controllable injection amount (minimum pulse width), if different amounts of fuel are injected by leading and trailing injections, the smaller injection amount may fall below the minimum injection amount. However, if equal injection amounts are set, such situation can be avoided.

Furthermore, a certain EGR amount can be assured, and the ignition timing is retarded upon catalyst regeneration.

Accordingly, the lean NOx catalyst is refreshed or regenerated by releasing and reducing its absorbed NOx from the lean NOx catalyst so as to increase allowable absorbing amount of NOx.

With this control as well, when the air-fuel ratio is changed to the rich side, NOx adsorbed in the lean NOx catalyst 36 is released, and the amount of CO in exhaust can be increased while assuring combustion stability by intake/compression divided injection, thus promoting NOx deoxidization.

Furthermore, since NOx in exhaust gas can be decreased by EGR and the retarded ignition timing, large [(CO amount)/(NOx amount)] can be set, and the NOx deoxidization effect can be further improved.

After an elapse of a predetermined period of time, the engine returns to lean combustion in the stratified combustion mode attained by compression stroke combined injection.

In this example, after catalyst regeneration is done for a predetermined period of time by intake/compression divided injection at an air-fuel ratio substantially equal to or lower than the stoichiometric air-fuel ratio, the engine returns to lean combustion in the stratified combustion mode attained by compression stroke combined injection. Alternatively, after intake/compression divided injection is done for a first setting time at an air-fuel ratio substantially equal to or lower than the stoichiometric air-fuel ratio, and combined injection or divided injection is done in the intake stroke for a second setting time, the engine may then return to lean combustion in the stratified combustion mode attained by compression stroke combined injection.

With this control, when most of NOx components released by the lean NOx catalyst are reduced by intake/compression divided injection during the first setting time, and the NOx amount decreases greatly, intake stroke injection is done to further continue regeneration for the second setting time while decreasing the CO amount to some extent, thus effectively preventing NOx and CO from being exhausted.

The present invention is not limited to the above embodiments and various changes and modifications can be made within the spirit and scope of the present invention. Therefore, to apprise the public of the scope of the present invention the following claims are made.

Accordingly, the present invention increases the amount of CO for promoting the regeneration of the lean NOx catalyst by setting the trailing injection timing within the compression stroke in which the ignition timing is short and the vaporization and atomization of fuel is deteriorated relatively. Further the present invention improves combustion stability during a recirculation of exhaust gas by setting the injection start timing of the trailing injection within a middle period of the equally divided three period of compression stroke where piston speed is higher so as to urge a mixture of air and fuel of the trailing injection in the compression stroke on the trailing injection timing set within the compression stroke.

Further, the lean NOx catalyst is refreshed (hereinafter referred to as "regenerated") by releasing and reducing its absorbed NOx from the lean NOx catalyst so as to increase allowable absorbing amount of NOx.

What is claimed is:

1. A control apparatus for a direct injection engine, which comprises a spark plug, an injector for directly injecting fuel into a combustion chamber, performs lean combustion by setting an air-fuel ratio higher than a stoichiometric air-fuel ratio in a low-load range of the engine, and comprises a lean NOx catalyst that adsorbs NOx in an excess oxygen atmosphere and releases NOx as an oxygen concentration decreases, and fuel injection timing setting means for setting the fuel-injection timing of the injector in the air-fuel ratio higher than a stoichiometric air fuel ratio on a low-load range of the engine to latter period at compression stroke which is divided to three equal first, middle and latter periods comprising:

air-fuel ratio changing means to changing the air-fuel ratio of the combustion chamber to be equal to or less than the stoichiometric air-fuel ratio temporarily when a NOx adsorption amount of the lean NOx catalyst becomes not less than a predetermined value during lean combustion;

exhaust gas recirculation means for recirculating some exhaust gas to an intake system; and control means for, when the air-fuel ratio of the combustion chamber is changed from the air-fuel ratio higher than the stoichiometric air-fuel ratio to the air-fuel ratio substantially equal to or less than the stoichiometric air-fuel ratio by the air-fuel ratio changing means, implementing catalyst regeneration control in accordance with a period which the air-fuel ratio is actually changed to a rich side, the catalyst regeneration control is to divide fuel injection from the injector, throughout the actual air-fuel ratio of the combustion chamber is substantially equal to or less than the stoichiometric air-fuel ratio, in at least two injections including a leading injection which starts within an intake stroke period and a trailing injection which starts within a compression stroke period by the fuel injection timing setting means and to set the injection start timing of the trailing injection within a middle period of the equally divided three periods of compression stroke where piston speed is higher so as to urge a mixture of air and fuel of the trailing injection in the compression stroke and to control said exhaust gas recirculation means to recirculate the exhaust gas in the set injection timing.

2. The apparatus according to claim 1, wherein when the NOx adsorption amount of the lean NOx catalyst becomes not less than a predetermined value during lean combustion, the air-fuel ratio is changed to be equal to or less than the stoichiometric air-fuel ratio, intake/compression divided injection including leading injection which starts within the intake stroke period and trailing injection which starts within the compression stroke period is done for a first setting time, combined injection or divided injection is done within the intake stroke period for a second setting time, and the engine then returns to lean combustion.

3. The apparatus according to claim 1, wherein said control means controls to retard an ignition timing of the engine from the ignition timing of MBT so as to implement the catalyst regeneration control.

4. A control apparatus for a direct injection engine, which comprises a spark plug, an injector for directly injecting fuel into a combustion chamber, performs lean combustion by setting an air-fuel ratio higher than a stoichiometric air-fuel ratio in a low-load range of the engine, and comprises a lean NOx catalyst that adsorbs NOx in an excess oxygen atmosphere and releases NOx as an oxygen concentration decreases, and fuel injection timing setting system which sets the fuel-injection timing of the injector in the air-fuel ratio higher than a stoichiometric air fuel ratio on low-load range of the engine to latter period at compression stroke which is divided to three equal first, middle and latter periods comprising:

air-fuel ratio changing system which changes the air-fuel ratio of the combustion chamber to be equal to or less than the stoichiometric air-fuel ratio temporarily when a NOx adsorption amount of the lean NOx catalyst becomes not less than a predetermined value during lean combustion;

exhaust gas recirculation system which recirculates some exhaust gas to an intake system; and control system which, when the air-fuel ratio of the combustion chamber is changed from the air-fuel ratio higher than the stoichiometric air-fuel ratio to the air-fuel ratio substantially equal to or less than the stoichiometric air-fuel ratio by the air-fuel ratio changing system, implementing catalyst regeneration control in accordance with a period which the air-fuel ratio is actually changed to a rich side, the catalyst regeneration control is to divide fuel injection from the injector, throughout the actual air-fuel ratio of the combustion chamber is substantially equal to or less than the stoichiometric air-fuel ratio, in at least two injections including a leading injection which starts within an intake stroke period and a trailing injection which starts within a compression stroke period by the fuel injection timing setting means and to set the injection start timing of the trailing injection within a middle period of the equally divided three penods of compression stroke where piston speed is higher so as to urge a mixture of air and fuel of the trailing injection in the compression stroke and to control said exhaust gas recirculation system to recirculate the exhaust gas in the set injection timing.

5. The apparatus according to claim 4, wherein when the NOx adsorption amount of the lean NOx catalyst becomes not less than a predetermined value during lean combustion, the air-fuel ratio is changed to be equal to or less than the stoichiometric air-fuel ratio, intake/compression divided injection including leading injection which starts within the intake stroke period and trailing injection which starts within the compression stroke period is done for a first setting time, combined injection or divided injection is done within the intake stroke period for a second setting time, and the engine then returns to lean combustion.

6. The apparatus of claim 4, wherein said control system controls to retard an ignition timing of the engine from the ignition timing of MBT so as to implement the catalyst regeneration control.

7. A control apparatus for a direct injection engine, which comprises a spark plug, an injector for directly injecting fuel into a combustion chamber, performs lean combustion by setting an air-fuel ratio higher than a stoichiometric air-fuel ratio in a low-load range of the engine, and comprises a lean NOx catalyst that absorbs NOx in an excess oxygen atmosphere and releases NOx as an oxygen concentration decreases, and fuel injection timing setting means for setting the fuel injection timing of the injector in the air-fuel ratio higher than a stoichiometric air-fuel ratio on a low-load range of the engine to a latter period of compression stroke which is divided to a three equal first, middle and latter periods comprising;

air-fuel ratio changing means for setting the air-fuel ratio of a combustion chamber higher than the stoichiometric air-fuel ratio on the low-load range of the engine and the air-fuel ratio of the combustion chamber substantially equal to or less than the stoichiometric air-fuel ratio on a higher-load range of the engine than the low-load range in which lean combustion is made, and changing the air-fuel ratio of the combustion chamber in correspondence with a change in running state from the air-fuel ratio higher than the stoichiometric air-fuel ratio to the air fuel ratio substantially equal to or less than the stoichiometric air-fuel ratio;

exhaust gas recirculation means for recirculating some exhaust gas to an intake system; and control means for, when the air-fuel ratio of the combustion chamber is changed from the air-fuel ratio higher than the stoichiometric air-fuel ratio to the air-fuel ratio substantially equal to or less than the stoichiometric air-fuel ratio by the air-fuel ratio changing means, implementing catalyst regeneration controlling accordance with period which the air-fuel ratio is actually changed to rich side, the catalyst regeneration control is to divide fuel injection from the injector, when the actual air-fuel ratio of the combustion chamber is substantially equal to or less than the stoichiometric air-fuel ratio, in at least two injections including leading injection which starts within an intake stroke period and trailing injection which starts within a compression stroke period by the fuel injection timing setting means, and to set the injection start timing of the trailing injection within a middle period of the equally divided three period of compression stroke where piston speed is higher so as to urge a mixture of air and fuel of the trailing injection in the compression stroke, and to control said exhaust gas recirculation means to recirculate the exhaust gas in the set injection timing.

8. The apparatus according to claim 1, wherein the leading injection in the catalyst regeneration control starts within a former half of the intake stroke.

9. The apparatus according to claim 1, wherein an injection amount of the leading injection in the catalyst regeneration control is set to be not less than ¼ a total injection amount.

10. The apparatus according to claim 9, wherein injection amounts of the leading and trailing injections in the catalyst regeneration control are set to be substantially equal to each other.

11. The apparatus according to claim 1, wherein said control means controls to retard an ignition timing of the engine from the ignition timing of MBT so as to implement the catalyst regeneration control.

12. The apparatus according to claim 11, wherein when the operating range shifts from the operating range in which lean combustion is made to the operating range in which the air-fuel ratio is set to be substantially equal to or less than the stoichiometric air-fuel ratio, intake/compression divided injection including leading information which starts within the intake stroke period and trailing injection which starts within the compression stroke period is done for a predetermined period of time, and fuel injection is then divisionally done within the intake stroke period.

13. A control apparatus for a direct injection engine, which comprises a spark plug, an injector for directly injecting fuel into a combustion chamber, performs lean combustion by setting an air-fuel ratio higher than a stoichiometric air-fuel ratio in a low-load range of the engine, and comprises a lean NOx catalyst that absorbs NOx in an excess oxygen atmosphere and releases NOx as an oxygen concentration decreases, and fuel injection timing setting system which sets the fuel injection timing of the injector in the air-fuel ratio higher that a stoichiometric air-fuel ratio on a low-load range of the engine to a latter period of compression stroke which is divided into three equal first, middle and latter periods comprising:

- air-fuel ratio changing system which sets the air-fuel ratio of a combustion chamber higher than the stoichiometric air-fuel ratio on the low-load range of the engine and the air-fuel ratio of the combustion chamber substantially equal to or less than the stoichiometric air-fuel ratio on a higher-load range of the engine than the low-load range in which lean combustion is made, and changing the air-fuel ratio of the combustion chamber in correspondence with a change in running state from the air-fuel ratio higher than the stoichiometric air-fuel ratio to the air fuel ratio substantially equal to or less than the stoichiometric air-fuel ratio;
- exhaust gas recirculation system which recirculates some exhaust gas to an intake system; and
- engine control system which, when the air-fuel ratio is of the combustion chamber changed from the air-fuel ratio higher than the stoichiometric air-fuel ratio to the air-fuel ratio substantially equal to or less than the stoichiometric air-fuel ratio by the air-fuel ratio changing system, implements catalyst regeneration control in accordance with a period which the air-fuel ratio is actually changed to a rich side, the catalyst regeneration control is to divide fuel injection from the injector, when the actual air-fuel ratio of the combustion chamber is substantially equal to or less than the stoichiometric air-fuel ratio, in at least two injections including a leading injection which starts within an intake stroke period, and trailing injection which within a middle period of the equally divided three periods of compression stroke where piston speed is higher so as to urge a mixture of air and fuel of the trailing injection in the compression stroke, and controls said exhaust gas recirculation system to recirculate the exhaust in the set injection timing.

14. The apparatus according to claim 13, wherein the leading injection in the catalyst regeneration control starts within a former half of the intake stroke.

15. The apparatus according to claim 13, wherein an injection amount of the leading injection in the catalyst regeneration control is set to be not less than ¼ a total injection amount.

16. The apparatus according to claim 15, wherein injection amounts of the leading and trailing injections in the catalyst regeneration control are set to be substantially equal to each other.

17. The apparatus according to claim 13, wherein said engine control system controls to retard an ignition timing of the engine from the ignition timing of MBT so as to implement the catalyst regeneration control.

18. The apparatus according to claim 17, wherein when the operating range shifts from the operating range in which lean combustion is made to the operating range in which the air-fuel ratio is set to be substantially equal to or less than the stoichiometric air-fuel ratio, intake/compression divided injection including leading information which starts within the intake stroke penod and trailing injection which starts within the compression stroke period is done for a predetermined period of time, and fuel injection is then divisionally done within the intake stroke period.

* * * * *

UNITED STATES PATENT AND TRADEMARK OFFICE
CERTIFICATE OF CORRECTION

PATENT NO. : 6,434,929 B1
DATED : August 20, 2002
INVENTOR(S) : Hirofumi Nishimura et al.

It is certified that error appears in the above-identified patent and that said Letters Patent is hereby corrected as shown below:

<u>Title page,</u>
Item [56], References Cited, U.S. PATENT DOCUMENTS, please delete
"5,642,705 A * 5/1994 Matsushita……………………..123/295"
"6,173,570 B1 * 1/2001 Takami et al…………………..60/286"
FOREIGN PATENT DOCUMENTS, please add:
-- EP 0732485   9/1996
   EP 0752521   1/1997
   EP 0767303   4/1997
   JO 04-231645……12/1992 --

Signed and Sealed this

Twenty-eighth Day of October, 2003

JAMES E. ROGAN
*Director of the United States Patent and Trademark Office*